United States Patent [19]

Briggs

[11] Patent Number: 4,728,585
[45] Date of Patent: Mar. 1, 1988

[54] FUEL CELL STACK WITH COMBINATION END-PRESSURE PLATES

[75] Inventor: Tyler A. Briggs, West Hartford, Conn.

[73] Assignee: International Fuel Cells Corporation, South Windsor, Conn.

[21] Appl. No.: 946,331

[22] Filed: Dec. 24, 1986

[51] Int. Cl.[4] ............................................. H01M 8/24
[52] U.S. Cl. ......................................... 429/36; 429/37; 429/38; 204/270
[58] Field of Search ....................... 429/34, 35, 36, 37, 429/38, 39; 204/246, 247, 265, 266, 270, 279

[56] References Cited

U.S. PATENT DOCUMENTS 4,345,009   8/1982   Fahle et al. ............................ 429/37
4,374,185   2/1983   Powers et al. ......................... 429/46
4,620,914  11/1986   Abens et al. ......................... 204/270

FOREIGN PATENT DOCUMENTS 9181271  10/1983   Japan ..................................... 429/37

Primary Examiner—Donald L. Walton
Attorney, Agent, or Firm—William W. Jones

[57] ABSTRACT

In place of the conventional thick graphite end plate, steel pressure plate combination at the ends of a fuel cell stack, a single steel end plate is used at each end. Each steel end plate is coextensive with the fuel cell component plates and the end plates are held in place by corner brackets mating with insulated tie rods, a load cable is connected directly to the end plates, and gas manifolds sealingly engage the vertical side surfaces of the end plates with a seal which resists unseating due to thermal growth differences between the component parts of the stack. A sealing plate to provide electrical continuity is interposed between the steel pressure plate and the adjacent cell component plates.

8 Claims, 5 Drawing Figures

FUEL CELL STACK WITH COMBINATION END-PRESSURE PLATES

DESCRIPTION

1. Technical Field

This invention relates to a simplified, more compact fuel cell stack having improved reactant manifold sealing. More particularly, the manifold seals are applied directly to endmost steel pressure plates on the stack and they resist unseating due to relative thermal growth of the components of the stack.

2. Background Art

The relatively larger fuel cell stacks, such as that shown in U.S. Pat. No. 4,345,009, Fahle et al., use top and bottom end constructions which are designed to compensate for potential differential thermal growth of stack components during the high temperature operating conditions which the stack occasions. The fuel cell stack, as its name implies, is merely a stack of repetitive fuel cells with interspersed coolant components. The cells and cooling portions are made up of plate-like elements which, in the larger commercial power plants, are formed from carbon and carbonized material. Thus, the operating or reaction-supporting portion of the stack, from the first cell to the last cell, is essentially carbon. The larger commercial stacks also include larger reactant manifolds which are mounted on the sides of the reaction-supporting portion of the stack and which supply the gaseous reactants to the cells in the stack. These manifolds are made of metal and have sealing flanges which oppose the carbon components of the stack. These sealing flanges have adhesively secured thereto, gaskets formed from Gore-Tex®, a fibrous polytetrafluoroethylene compound. The gaskets will, in the prior art, abut the carbon components of the stack and be compressed thereagainst by elements such as, bands, straps, tie rods, or the like. It will be appreciated that the top and bottom sealing flanges of the manifolds will be upwardly and downwardly offset from the uppermost and lowermost cell components in the stack respectively, to ensure proper top and bottom manifold seals plus adequate reactant flow to the uppermost and lowermost cells in the stack. In order to achieve this objective, the prior art stacks have included thick graphite end plates disposed above and below the uppermost and lowermost cell components respectively. The top and bottom manifold flange seals abut these top and bottom graphite end plates respectively. The reason that the thick graphite end plates are used to face the top and bottom manifold flange seals is to eliminate leakage from the manifolds along the flanges due to differences in thermal growth of the stack components. Since the cell components and the graphite end plates are both made from the same material, their thermal growth characteristics will be the same, and there will be no manifold seal disruption where the seal crosses the joints between the cell component plates and the end plates.

DISCLOSURE OF INVENTION

This invention relates to an improved, simplified fuel cell stack, of generally commercial power plant size, where the thick graphite end plates, the current collector plates, and the overhanging steel pressure plates are eliminated from the stack. In the stack of this invention, the thick graphite end plates are replaced by the steel pressure plates which are scaled down to the same size as the graphite end plates which they replace. The steel pressure plates are disposed adjacent to the cell plate components and, at ambient temperatures, the pressure plates are coextensive in cross section with the remainder of the stack. Interposed between the steel pressure plates and the graphite cell component plates, there are thin porous graphite plates impregnated with PTFE which provide a gas seal between the graphite plates and the steel plates, but do not retard passage of current from the graphite plates into the steel plates. The PTFE in these thin plates actually is pressed into the interstitial spaces in the porous graphite plates at each end of the stack. The porous graphite plate provides a conformable element between adjacent steel and graphite components. The Gore-Tex® gaskets which seal the edges of the reactant manifolds have both faces coated with a fluorocarbon adhesive. The adhesive coating on the manifold flange side is for adhering the gaskets to the manifold flanges. The adhesive coating on the plate side of the gaskets serves an additional purpose, however. Since the steel and graphite plates abut each other, and these materials possess different thermal growth characteristics, there will occur a lateral step between the steel plate side edges and the adjacent graphite plate side edges when the temperature of the stack rises during operation. The step will not be present when the stack is assembled, or is down, since the plates are made to the same sizes. This step, or steps, are due to the fact that steel expands to a greater extent than graphite when heated. The adhesive layer between the seal gasket and the stack plates will force the pliable gasket to conform to these steps because the adhering forces will be much greater than the forces required to change gasket thickness and maintain the seal during such periods of thermal growth. Current can be tapped directly off of the top and bottom surfaces of the steel pressure plates. Brackets are secured to the corners of the pressure plates and extend outwardly therefrom to provide securement surfaces for the tie rods which compress the stack. The brackets are provided with insulating sleeves which electrically insulate the tie rods from the rest of the current conducting stack components. This arrangement provides an additional advantage in that it allows access to the top and bottom sides of the manifolds which in turn allows reactant ports to be placed on these surfaces. The ability to tap into the reactant manifolds through their top and bottom sides results in better reactant distribution within the manifolds.

It is therefore an object of this invention to provide a fuel cell stack structure which is less expensive and less complicated.

It is a further object of this inventon to provide a stack structure of the character described wherein steel pressure plates directly abut the endmost graphite cell component plates on the stack.

It is another object of this invention to provide a stack structure of the character described wherein a gas sealed joint between the steel and graphite plates is maintained during operation of the stack despite different thermal growth characteristics of the steel and graphite.

It is an additional object of this invention to provide a stack structure of the character described wherein manifold-stack gas seals are maintained despite the different thermal growth characteristics of the steel and graphite.

These and other objects and advantages of this invention will become more readily apparent to those skilled in the art from the following detailed description of a preferred embodiment thereof when taken in conjunction with the accompanying drawings.

BEST MODE FOR CARRYING OUT THE INVENTION

Figure 1:
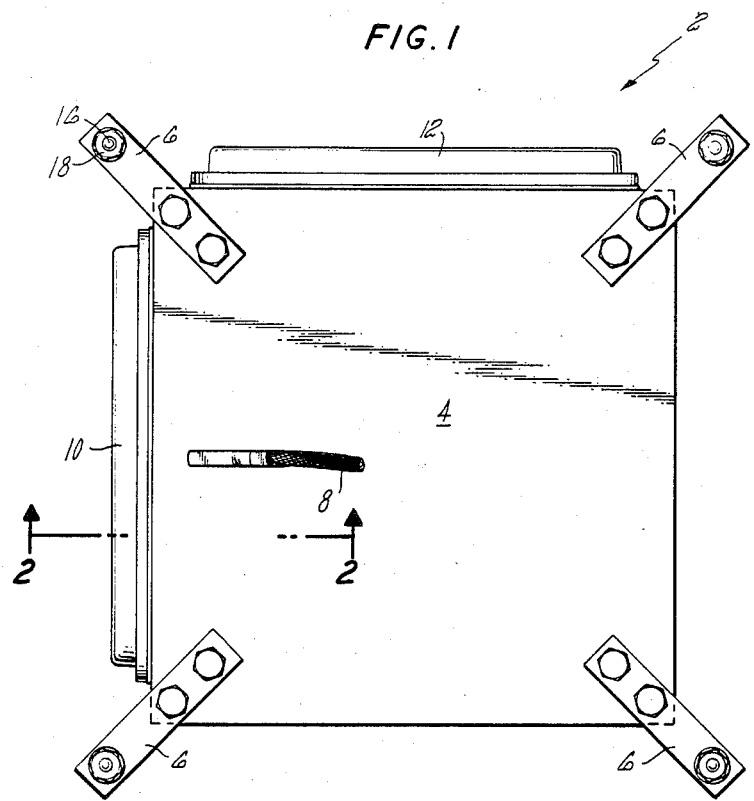
FIG. 1 is a top plan view of a fuel cell stack formed in accordance with this invention.

Referring now to the drawings, there is shown in FIG. 1 the top end of a fuel cell stack, denoted generally by the numeral 2, which embodies the end structure and manifold seals of this invention. The stack 2 has a top steel pressure plate 4 which has brackets 6 bolted to its upper surface at each corner. The brackets 6 are tie rod brackets, as will be detailed hereinafter. A load cable 8 is mounted on the upper surface of the plate 4 for conducting electricity produced by the stack 2. Reactant manifolds 10 and 12 are mounted on adjacent side surfaces of the stack 2, one of the manifolds being an oxidant manifold, and the other being a fuel manifold. It will be understood that the manifolds 10 and 12 control flow of the reactant gases to and from the stack 2.

Figure 2:
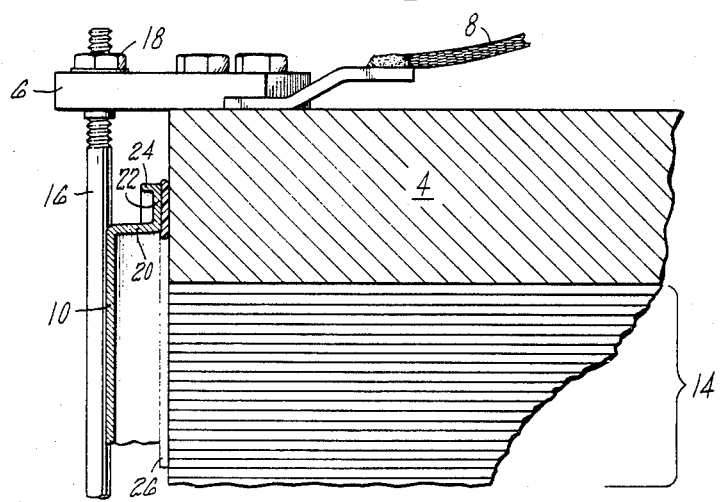
FIG. 2 is a fragmented sectional view taken along line 2—2 of FIG. 1.

Referring now to FIG. 2, it will be noted that the steel pressure plate 4 rests directly on the cell component plates collectively denoted by the numeral 14. The cell component plates 14 are relatively thin graphite plates in which the electrochemical reaction of the stack takes place. The stack components are secured together by tie rods 16 which pass through apertures in the brackets 6 and which are secured by nuts 18. It will be appreciated that the bracket apertures are provided with insulating sleeves through which the rods 16 pass, and which include top flanges against which the nuts 18 tighten. In this fashion the tie rods 16 are electrically insulated from the stack. The manifold 10 is a rectangular component which is dished and has side walls 20 and peripheral sealing flanges 22 with outwardly turned free edges 24. A sealing gasket 26 is sandwiched between the sealing flange 22 and the cell component plates 14 and pressure plate 4 to seal the interior of the manifold 10 from ambient surroundings. The sealing gaskets 26 are preferably made from a polytetrafluoroethylene compound sold by W. L. Gore and Associates, Elkton, Md. under the trademark Gore-Tex ®. This material is described in U.S. Pat. Nos. 3,953,566 and 4,187,390. It will be noted that the pressure plate 4 is made substantially identical in cross-section to the cell component plates 14.

Figure 3:
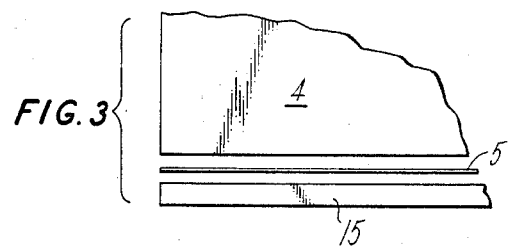
FIG. 3 is a fragmented exploded sectional view of the components forming the joint between the steel pressure plates and the endmost graphite cell plates in the stack.

Referring now to FIG. 3, the construction of the horizontal interface joint between the pressure plate 4 and the uppermost graphite cell component plate 15 is shown. The plate 15 is made from a porous graphite material, and on assembly, a thin sheet of fluorocarbon plastic or rubber 5 is placed on top of the plate 15. The steel pressure plate 4 is then placed over the sheet 5. The thickness of the sheet 5 is on the order of about 0.010 inch (0.3 mm), and after the pressure plate 4 is in place, vertical compression of the stack components during heat-up causes the thermally softened sheet 5 to flow down into the interstitial spaces of the plate 15. The sheet 5 thus seals the joint between the plate 15 and the pressure plate 4 while not interfering with the flow of electrons between the plates 15 and 4.

Figure 4:
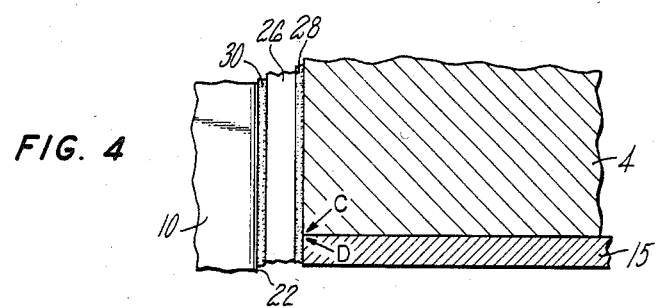
FIG. 4 is an enlarged fragmented sectional view showing the manifold gasket and the horizontal joint between the steel pressure plate and the endmost graphite cell plate in the stack at relatively ambient temperatures.
Figure 5:
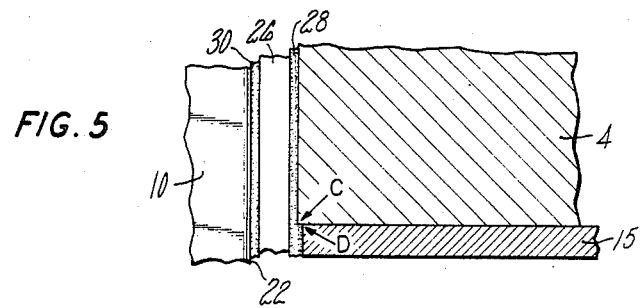
FIG. 5 is a view similar to FIG. 4 but showing the alteration of the joint resulting from differential thermal creep and showing how the gasket seal is maintained despite the joint alteration.

Referring now to FIGS. 4 and 5, there is shown the manner in which the vertical side manifold gasket seals are maintained at the horizontal joint between the plates 15 and 4 during operation of the stack. The PTFE gasket 26 has an inner layer of adhesive 28 and an outer layer of adhesive 30 coated onto it. The adhesives are fluorocarbon adhesives, the inner layer 28 having a thickness in the range of about 0.005 to about 0.010, and the outer layer 30 having a thickness of about 0.005 to about 0.010. In FIG. 4, the stack is shown at ambient or near ambient temperatures. As noted, the plate 4 is formed with a cross-sectional configuration which matches that of the component plates 14 so that, when assembled, the adjacent corners C and D of the plates 4 and 15 respectively will be coplanar so that the gasket 26 can seal the manifold where it crosses the joint between the plates 4 and 15. When the stack 2 is operating to produce electricity, it operates at temperatures well above ambient, as for example, temperatures in the range of about 350° F. to about 400° F. for extended periods of up to 40,000 hours. Since the plate 4 is made from steel, it will expand more than the plate 15, which is graphite, when subjected to the elevated operating temperatures. This unequal expansion will cause the corner C to move out of alignment with the corner D so that a small step will form between the plates 4 and 15 as shown in FIG. 5. When this occurs, the inner adhesive layer 28 cause the pliable gasket to stretch to fill the step at the corners C and D so that the seal between the manifold 10 or 12 and the stack plates will not break. Since the manifolds 10 and 12 overlie the sides of the pressure plate 4, a protective coating of a fluorocarbon resin is applied to the vertical sides of the plate 4 to prevent corrosion thereof by acid which may condense in the manifolds 10 and 12.

It will be appreciated that the stack end construction of this invention is less complex and less expensive than the prior art end construction, since the thick graphite end plate is eliminated from both ends of the stacks. Elimination of the overhanging pressure plate will allow access to the top and bottom end surfaces of the reactant manifolds so that reactant ducts can be accessed into the manifolds through the top and bottom end walls. This will enable more efficient and even distribution of reactant gases to the cells in the stack.

Since many changes and variations of the disclosed embodiment of the invention may be made without departing from the inventive concept, it is not intended to limit the invention otherwise than as required by the appended claims.

I claim:

1. A fuel cell stack comprising:

(a) a plurality of thin carbon fuel cell component plates stacked one atop another to provide a reaction portion of the stack;

(b) a steel pressure plate disposed directly atop an uppermost one of said carbon plates, said steel pressure plate being laterally coextensive with said carbon plates at ambient temperatures;

(c) at least one reactant manifold mounted on a side of said stack, said manifold having a peripheral sealing flange which faces side surfaces of said carbon plates and a corresponding side surface of said pressure plate;

(d) a polymeric sealing gasket interposed between said manifold sealing flange and adjacent side surfaces of said carbon plates and said pressure plate to provide a seal between the manifold interior and ambient surroundings; and (e) a first adhesive layer sandwiched between said gasket and adjacent side surfaces of said carbon and pressure plates to adhere said gasket to said adjacent side surfaces, said first adhesive layer being operable to fill any discontinuity which may occur at adjacent corners of said pressure plate and said uppermost one of said carbon plates due to differential thermal growth of said pressure plate and said carbon plates during operation of the stack whereby the manifold interior remains sealed during periods of elevated operational stack temperatures.

2. The fuel cell stack of claim 1 further comprising brackets mounted at corners of said pressure plate and extending outwardly thereof for reception of tie rods to compress said stack.

3. The fuel cell stack of claim 1 further comprising a sheet of fluorocarbon rubber or plastic interposed between said pressure plate and said uppermost one of said carbon plates, and pressed into interstitial spaces of said uppermost one of said carbon plates to form a seal between said plates.

4. The fuel cell stack of claim 1 further comprising a load cable connected to said pressure plate for drawing current from said stack.

5. A fuel cell stack comprising:
(a) a plurality of thin carbon fuel cell component plates stacked one atop another to provide a reaction portion of the stack;
(b) a steel pressure plate disposed atop an uppermost one of said carbon plates;
(c) a layer of fluorocarbon rubber of plastic interposed between said pressure plate and said uppermost one of said carbon plates, said layer being positioned in interstices of said uppermost one of said carbon plates to form a vapor barrier between said pressure plate and said uppermost one of said carbon plates; and
(d) a load cable connected to said pressure plate for drawing current from said stack.

6. The fuel cell stack of claim 5 wherein said pressure plate is laterally coextensive with said carbon plates at ambient temperatures.

7. The fuel cell stack of claim 6 further comprising at least one reactant manifold mounted on a side of said stack, said manifold having a peripheral sealing flange which faces side surfaces of said carbon plates and a corresponding side surface of said pressure plate, there being a polymeric sealing gasket interposed between said sealing flange and adjacent side surfaces of said carbon plates and said pressure plate to seal the manifold from ambient surroundings, and there being a first adhesive layer sandwiched between said gasket and adjacent side surfaces of said carbon and pressure plates to adhere said gasket to said adjacent side surfaces, said first adhesive layer being operable to fill any discontinuity which may occur at adjacent corners of said pressure plate and said uppermost one of said carbon plates due to differential thermal growth of said pressure plate and said carbon plates during operation of the stack whereby the manifold remains sealed to ambient surroundings during periods of elevated operational stack temperatues.

8. The fuel cell stack of claim 8 further comprising brackets mounted at corners of said pressure plate and extending outwardly therefrom for reception of tie rods to compress said stack.

* * * * *